United States Patent
Vatsaas et al.

(10) Patent No.: US 7,261,274 B2
(45) Date of Patent: Aug. 28, 2007

(54) VIBRATION ISOLATION SYSTEM FOR DAGGER MOUNTED EQUIPMENT

(75) Inventors: Richard D. Vatsaas, Eagan, MN (US); Wayne E. Eiden, Resemount, MN (US); Clarie C. Engelhart, Chaska, MN (US); Robert D. Guion, deceased, late of St. Paul, MN (US); by Marie Guion, legal representative, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 345 days.

(21) Appl. No.: 10/430,624

(22) Filed: May 6, 2003

(65) Prior Publication Data

US 2004/0232306 A1 Nov. 25, 2004

(51) Int. Cl.
*F16M 13/00* (2006.01)
(52) U.S. Cl. ............... 248/635; 267/141.2; 248/573
(58) Field of Classification Search ............... 248/609, 248/638, 608, 632, 635, 615, 573, 599; 267/141.1, 267/141.2, 141.4, 140.11, 136
See application file for complete search history.

(56) References Cited

U.S. PATENT DOCUMENTS

| | | | | |
|---|---|---|---|---|
| 735,946 A | * | 8/1903 | Coleman | 40/617 |
| 2,160,297 A | * | 5/1939 | Thompson | 248/635 |
| 2,450,722 A | * | 10/1948 | Drije | 248/311.2 |
| 2,920,340 A | * | 1/1960 | Hopkins | 16/248 |
| 3,378,881 A | * | 4/1968 | Hentzi et al. | 16/312 |
| 3,769,730 A | * | 11/1973 | Dole | 40/732 |
| 5,110,081 A | * | 5/1992 | Lang, Jr. | 248/635 |
| 5,306,121 A | * | 4/1994 | Heflin et al. | 417/363 |
| 5,460,348 A | * | 10/1995 | Cox | 248/638 |
| 6,024,338 A | * | 2/2000 | Koike et al. | 248/638 |
| 6,378,832 B1 | * | 4/2002 | Li et al. | 248/637 |

FOREIGN PATENT DOCUMENTS

FR 2284060 * 9/1974

* cited by examiner

*Primary Examiner*—A. Joseph Wujciak, III
(74) *Attorney, Agent, or Firm*—Jacobson & Johnson

(57) ABSTRACT

A vibration isolation mount, a vibration isolation system and a method of resiliently mounting a device, and particularly a device that is mounted in a cramped space with the vibration isolation mount including a dagger plate having an elastomer secured thereto to permit a resilient mounting of the dagger plate on a device and a dagger pin for mounting on the support housing for blind engagement with the dagger pin with the dagger pin forming a snug but non-interference fit with a sidewall of an alignment hole in the dagger plate. The method also includes the mounting of a device by resiliently securing a dagger plate to a device and then positioning the device on a dagger pin by moving the device along an axis parallel to the axis of the dagger pin and then securing a further portion of the device to a support housing.

10 Claims, 3 Drawing Sheets

VIBRATION ISOLATION SYSTEM FOR DAGGER MOUNTED EQUIPMENT

STATEMENT REGARDING FEDERALLY SPONSORED RESEARCH OR DEVELOPMENT

The U.S. Government has a paid-up license in this invention and the right in limited circumstances to require the patent owner to license others on reasonable terms provided for by the terms of contract F33657-99-C-2048 and awarded by the U.S. Air Force.

FIELD OF THE INVENTION

This invention relates generally to vibration isolating and, more specifically, to vibration isolation systems and method for vibration mounting of articles in cramped spaces.

CROSS REFERENCE TO RELATED APPLICATIONS

None

REFERENCE TO A MICROFICHE APPENDIX

None

BACKGROUND OF THE INVENTION

In order to efficiently use space, which may be at a premium, equipment is often designed to fit within available space, which may be a pocket type compartment i.e. a compartment with only one open side in which to insert the equipment. As a result there is usually very little clearance between the equipment being mounted and the surrounding equipment or housing to either place and secure a fastener.

One of the ways of mounting a device in a pocket type compartment is through the use of dagger pins that are mounted in the bottom of the pocket type compartment and dagger plates which are mounted on the device. The dagger pins coact with the dagger plates to constrain the article from movement in two mutually perpendicular directions but allow movement in a third axis which is parallel to a central axis of the dagger pins, thus allowing the dagger plate to be slid onto the dagger pins.

Briefly, the dagger pin mounting allows one to blind mount the device in a pocket type compartment by first sliding one end of the device into the pocket compartment until the dagger plates on the equipment engage the dagger pins in the compartment. Next, one can secure an exposed end of the device to a support housing by conventional fasteners.

By having a dagger plate on the end of the device that is inserted in a pocket type recess and mounting a dagger pin in the pocket one can blind mount the device on a dagger pin without the need to have a hand or tool access space to secure a fastener. That is, the dagger plate can be slid into engagement around the dagger pin without having to actually see either the dagger pin or the dagger plate. Once in engagement the dagger pin and the dagger plate coact without further action to restrict the device from lateral movement.

The other end of the device is then retained by extending a fastener through the device and into the support housing at an angle which is generally perpendicular to the axis of the dagger pin to prevent the device from moving out of the pocket compartment.

The use of dagger pins that restrain motion in two mutually perpendicular axis in conjunction with a second mount that restrains the movement of the device in the third mutuality perpendicular axis ensures that the device can be maintained in a fixed condition on the support housing. However, dagger pin mounts are undesirable in high vibration environments, because the necessary alignment clearances between the dagger pin and the dagger plate allows the device to swing and impact on the dagger pin generating amplified loads on the device.

As a result, dagger plate mounting requires one to compensate for potential misalignment of the dagger pins in the compartment and the dagger plates on the device. The alignment compensation techniques used, namely, forming a dagger pin hole in the dagger plate that is larger than the dagger pin can lead to high vibration input to the device causing premature device failure. More specifically, an elongated slot is formed in the dagger plate for engagement with a round dagger pin, which leaves a "free spacing" between the dagger pin and the dagger pin hole in the dagger plate.

The problem of vibration failure of a device secured by dagger plate and a dagger pin is accelerated if the alignment compensation techniques involves "free spacing" with only one of a set of dagger pins is provided with a smaller diameter than the diameter of the alignment holes in order to make it easier to align and position the device on the dagger pins. For example, a small diameter difference between the dagger pin and the sidewalls of the hole in the dagger plate can quickly lead to device failure as the article is free to vibrate laterally before being stopped by the contact of the cylindrical surface of the dagger pin with the sidewall of the alignment hole. Unfortunately, it is virtually impossible to provide for effective blind mounting unless one maintains at least some free spacing between the dagger plates on the device and the dagger pins, which is done by making at least one of the holes in the dagger plate substantially larger than the dagger pin. The result is the device soon begins to vibrate at its natural frequency, which hastens system failure.

In addition to devices being mounted in a tight or cramped space the device might also be positioned behind other devices, which requires removing other devices in order to replace the device if it should fail. Thus, there is a need to mount a device in a tight or cramped space in a protected conditions so that the device can be maintained therein with infrequent need for servicing. Consequently, the device needs to be isolated from the support housing to inhibit vibrations that can cause premature failure of the device.

Generally, vibration isolation is achieved with some type of elastomer positioned between the device and the support housing in order to damp vibrations. Unfortunately, conventional dagger pin mountings provide rigid contact between the dagger pin, the dagger plate and the article.

The present invention provides a mounting system that permits an article to mounted in a tight cramped space using a dagger plate and a dagger pin while at the same time providing a vibration isolation mount.

SUMMARY OF THE INVENTION

A vibration isolation mount, a vibration isolation system and a method of resiliently mounting a device, and particularly a device that is mounted in a cramped space with the vibration isolation mount including a dagger plate having an elastomer member secured thereto to permit a resilient mounting of the dagger plate on a device and a dagger pin for mounting on the support housing for blind engagement with the dagger plate with the dagger pin having a snug but non-interference fit with an alignment hole in the dagger plate. The method includes the mounting of a device by resiliently securing a dagger plate to a device and then positioning the device on a dagger pin by moving the device along an axis parallel to the axis of the dagger pin and then thereafter securing a further portion of the device to a support housing.

DESCRIPTION OF THE PREFERRED EMBODIMENT

Figure 1:
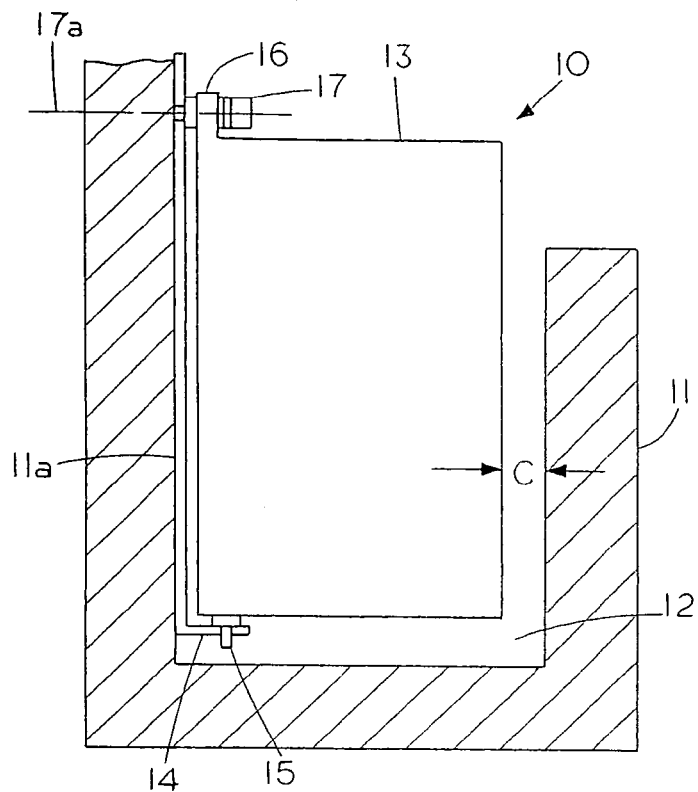
FIG. 1 is a side view of a device mounted in a cramped space.

FIG. 1 shows a system 10 with a device 13 mounted in a cramped space or pocket compartment 12 formed by a bulkhead or support housing 11. Device 13 is supported on the bottom by an alignment pin 15, which is often referred to as a dagger pin, that is fixedly held in bracket 14 and on the top by a fastener 17 that extends though an integral lug 16 in device 13 to hold device 13 on support housing 11. The clearance between the housing 11 and the device 13, which is designated by "c", is generally insufficient to extend a fastener perpendicularly into the mounting surface 11a on the support housing or insufficient to insert a tool or hand to secure a fastener. Consequently, in this type of environment dagger plates and dagger pins are oftentimes used to mount the device to the support housing.

Figure 2:
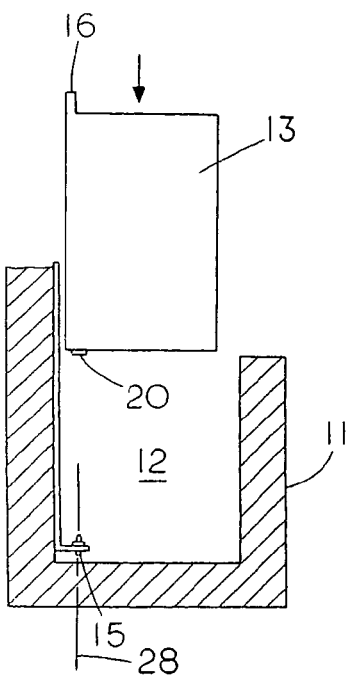
FIG. 2 is a side view of the device being inserted into the cramped space.

To illustrate the difficulty in mounting a device in a pocket type compartment reference should be made to FIG. 2 which shows the device 13 being lowered into the cramped space or pocket compartment 12 so that an alignment hole in a mounting plate, which is often referred to as a dagger plate 20, can be brought into engagement with dagger pin 15. While dagger pin mounting prevents movement in the two axis perpendicular to the dagger pin it does not prevent movement in the axis extending along the central axis 28 of the dagger pin 15. As can be seen in FIG. 1 the mounting procedure with a dagger pin mount allows the sliding of the device 13 into the support housing and brings the dagger plate 20 and dagger pin 15 into engagement with each other. The mounting of the device is completed by extending a fastener 17 through a lug or flange 16 on device 13 and into the support surface 11a. In general, the fastener 17 is located on an axis 17a which is non parallel to the axis 28 of the dagger pin and preferably perpendicular to the axis of dagger pin 15 so that the device 13 can be maintained on the support housing 11. Unfortunately, vibration to the support housing 11 can cause premature failure of the dagger pin mounting members or the equipment contained within device 13. The present invention allows one to mount an article on a support housing using dagger pins and dagger plates and at the same time isolate the article from vibrations.

Figure 3:
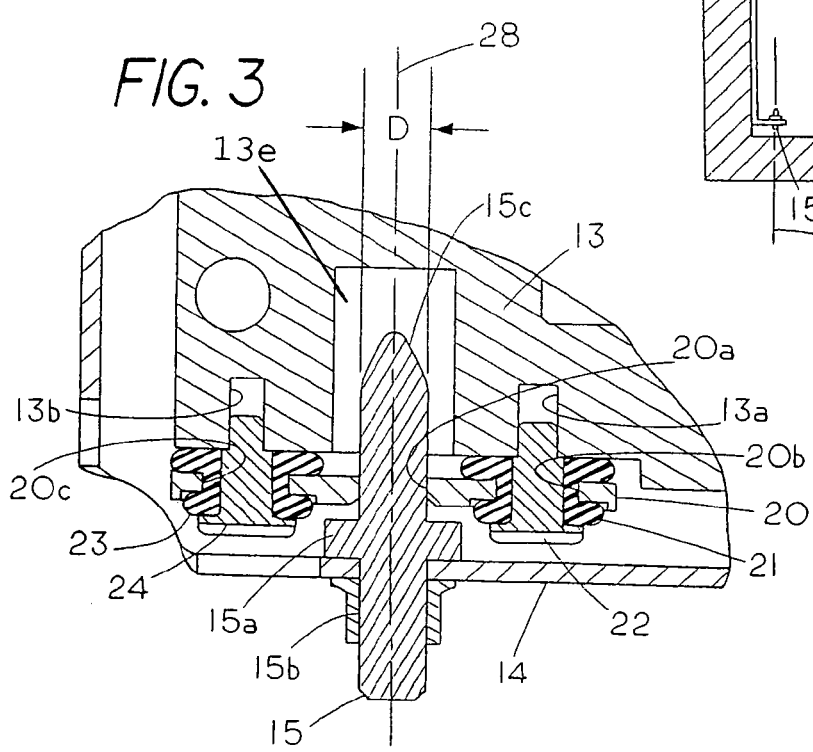
FIG. 3 is a sectional view of a dagger pin engaging a dagger plate that is secured to a device that is to be protected from vibration.

FIG. 3 shows a first embodiment for use in a vibration isolation mount using a dagger pin 15 and dagger plate 20. A cylindrical dagger pin 15 is sandwichingly secured to frame 14 by a flange 15a and a fastener 15b that fixedly support the dagger pin 15 on frame 14. Dagger pin 15 has a diameter designated by $D_1$ and has a conical pointed end 15c to facilitate alignment and positioning of dagger pin 15 with respect to dagger plate 20 which is mounted to device 13.

One end of dagger plate 20 is shown secured to device 13 through a first fastener, such as a shoulder screw 22 that extends through an elastomer member, which can comprise a washer or grommet 21, and into threaded engagement with a threaded recess 13a in device 13 to provide resilient displacement of dagger plate 20 with respect to device 20. The elastomer grommet 21 extends through an opening 20b on one end of dagger plate 20. Similarly, the other end of dagger plate 20 is shown secured to device 13 through a second fastener, such as a shoulder screw 24 that extends through an elastomer member, which can comprise a washer or grommet 23, and into threaded engagement with a threaded recess 13b in device 13. The elastomer grommet 23 extends through an opening 20c on one end of dagger plate 20. The elastomer grommets 21 and 23 permit elastomeric displacement of device 13 with respect to dagger plate 20 to provide vibration and shock isolation between dagger plate 20 and device 13.

In the present invention, the coaction of dagger pin 15 with the dagger plate 20 prevents lateral displacement of the dagger plate 20 with respect to dagger pin 15 as the diametrical clearance between the diameter $D_1$ of the dagger pin 15 and the diameter of the hole 20a in dagger plate 20 is such that the two members fit snugly with each other but do not form an interference fit that would make assembly difficult. By interference fit it is meant that there is negative diametrical clearance between members and requires one to force two members into engagement with each other by deforming one or the other. By snug fit, it is meant that the two members can be brought into engagement with each other without deforming one or the other yet the diametrical clearance is so small that the two members move as a unit, i.e. there is substantially no discernible lateral displacement of one member with respect to the other. In the mount illustrated, the dagger plate 13 can move along dagger pin axis 28 but can not move in an axis perpendicular to axis 28 since the diametrical clearance is sufficiently small so as to form a snug fit between the exterior cylindrical surface of dagger pin 15 and the sidewall of the alignment hole 20b in dagger plate 20.

In the embodiment shown the device 13 includes a dagger pin recess 13e having a dimension sufficiently large so that under operating conditions it permits lateral displacement of the device 13 with respect to dagger pin 15 without causing contact engagement between the a dagger pin 15 and the device 13.

Figure 4:
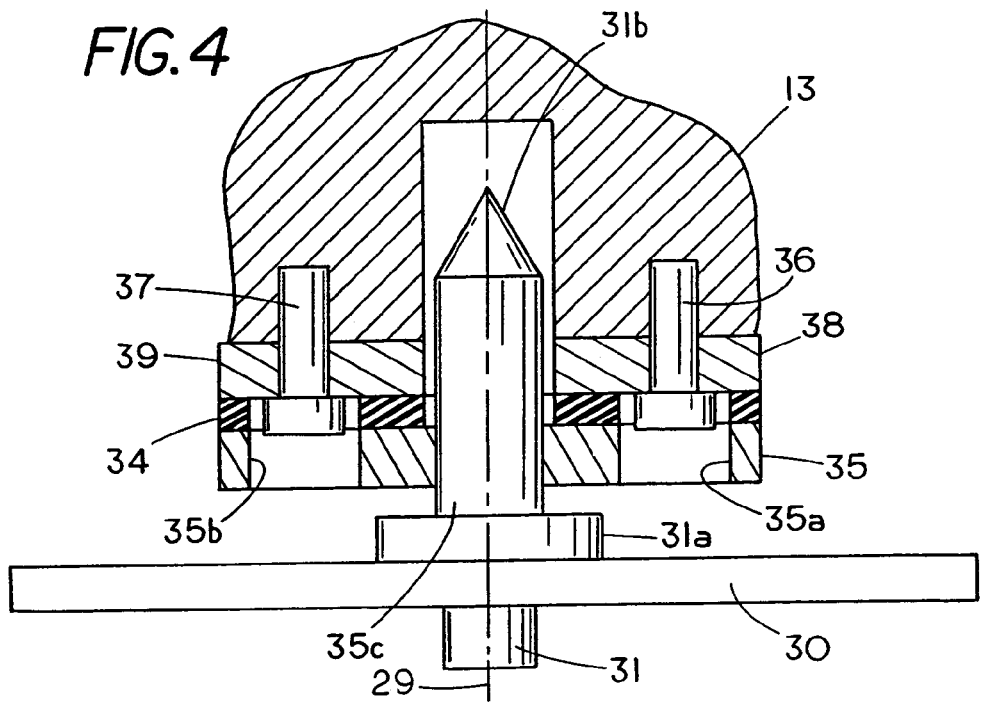
FIG. 4 is a sectional view of an alternate embodiment of dagger pin engaging a dagger plate that is secured to a device that is to be protected from vibration.

FIG. 4 shows an alternate embodiment of a vibration isolation mount comprising a dagger pin 31 with a conical end 31b engaging a dagger plate 35. In the embodiment shown, dagger pin 31 is secured to frame 30 through a flange 31a by welding or the like.

The dagger plate 35 has a central opening or alignment hole 35c for forming a snug but non-interference fit with dagger pin 31 and includes side clearance openings 35a and 35b for extending fasteners therethrough. One face of dagger plate 35 includes an elastomer member 34 bonded to dagger plate 35. The elastomer member can be bonded through adhesives, vulcanizing or the like.

The elastomer member 34, which has the general elongated shape of the dagger plate 35, is bonded to one face of dagger plate 35 and has one end bonded to an annular rigid or metal washer 39 that is secured to housing 13 by a fastener 37, which may be a shoulder screw or a rivet. Similarly, the other end of elastomer member 34, is also bonded to an annular rigid or metal washer 38 that is secured to housing 13 by a fastener 36, which may be a shoulder screw or a rivet.

In this embodiment, the dagger plate assembly can be secured to the device 13 as one piece. The dagger plate assembly of FIG. 4, like the dagger plate assembly of FIG. 3, allows for the movement of the dagger plate 35 with respect to the device 13. The snug but non-interference fit between pin 31 and dagger plate 35 prevents lateral movement therebetween in the axis perpendicularly to the central axis of pin 31.

Thus the embodiments of FIG. 3 and FIG. 4 illustrate a dagger pin mount that vibrationly isolates the device 13 from the support housing thought the use of elastomer members carried by the dagger plate. In the embodiment shown the dagger plates are secured with two screw fasteners, however, it can be appreciated that the dagger plates need only be secured with a single fastener.

Figure 5:
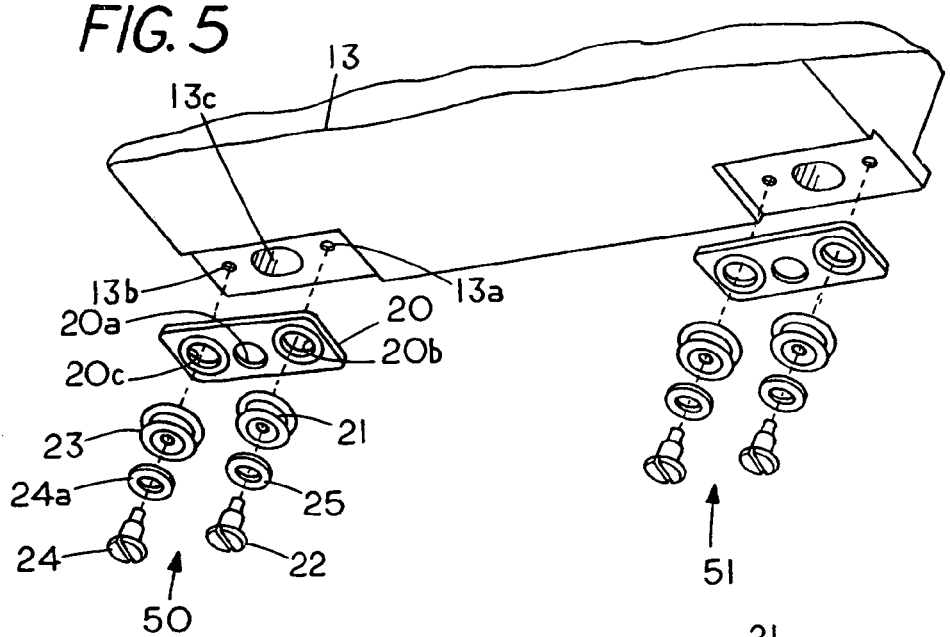
FIG. 5 is an exploded view showing the dagger plate and fasteners for elastomerically securing the dagger plates to the device that is to be protected from vibration.

FIG. 5 shows an exploded view of a portion of a device 13 wherein two dagger plate assembles are used to mount and isolates device 13 from vibration. The dagger plate mounts 50 and 51 are shown in an exploded view as they would be mounted on opposite sides of device 13 which is to be isolated from vibration. Dagger plate 20 is shown having a first cylindrical opening 20b on one end for receiving elastomer member 21 and a second cylindrical opening 20c on the other end for receiving the elastomer member 23. The assembly process includes extending shoulder screw 22 through a rigid washer 25 and elastomer member 21, which is held in dagger plate 20, and into the threaded recess 13a on device 13 and extending shoulder screw 24 through a rigid washer 24a and elastomer member 23, which is held in dagger plate 20, and into the threaded recess 13b on device 13. This action resiliently secures the dagger plate 20 to the article to vibrationly isolate the dagger plate 20 from the device 13.

As the fastening members and the fastening process for dagger plate 51 is identical to the aforedescribed dagger plate mount 50 they are not described herein.

Figure 5A:
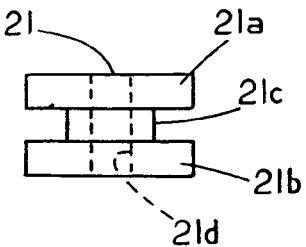

FIG. 5A shows a more detailed side view of elastomer member 21 showing member 21 includes an annular flange 21a on one end and an annular flange 21b on the opposite end with a central annular member 21c joining the two annular flange s into a single one piece elastomer member. The annular flange s 21a and 21b perform a dual function in that they provide an elastomer connection between the dagger plate and the housing device in all three axis as well as hold the elastomer member 21 and 23 on the dagger plate 20 as illustrated in FIG. 3.

Figure 6:
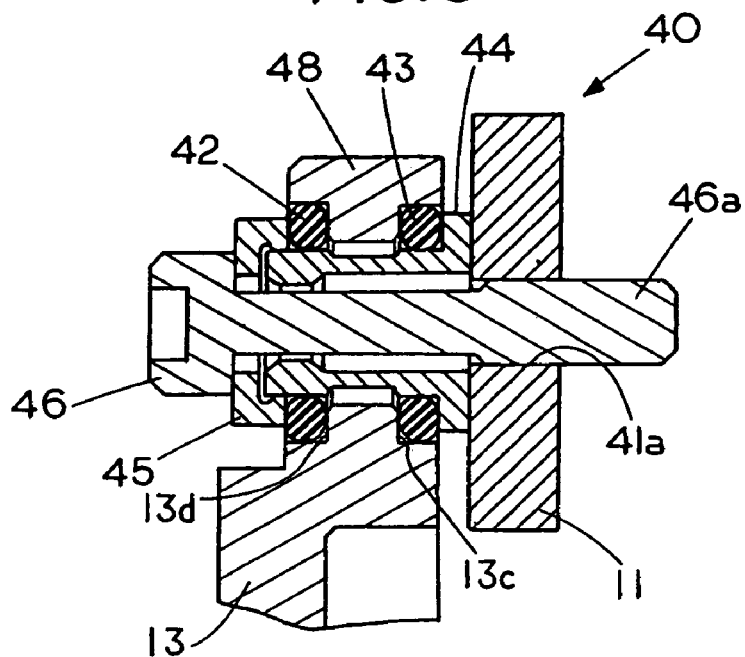
FIG. 6 is a sectional view of mount for securing and retaining the device in a third axis.

FIG. 6 shows a partial view of a second vibration isolation mount, which can be used with the dagger plate mount of FIG. 3 or FIG. 4. In the embodiment shown in FIG. 6 a fastener extends perpendicular into the support housing 11. The mounting assembly comprises a shoulder screw 46 having a threaded end 46a for engaging with a threaded recess 41a in housing 11. An annular rigid member comprising a ferrule 44 extends around a portion of screw 46. Located proximate ferrule 44 are a set of elastomer rings 42 and 43 which are held in a spaced axial condition from each other by the coaction of an annular shoulder 13c and an annular shoulder 13d. The annular shoulder 13c and 13d, which are forming as an integral collar 48 in housing 13, and ferule 44 coact to provide an elastomer mount between shoulder screw 46 and device 13. Thus, the elastomer rings 42 and 43 thereby permit restrained elastomeric displacement of the device 13 with respect to support housing 11 to vibrationly isolate the device 13 from the support housing 11.

Figure 7:
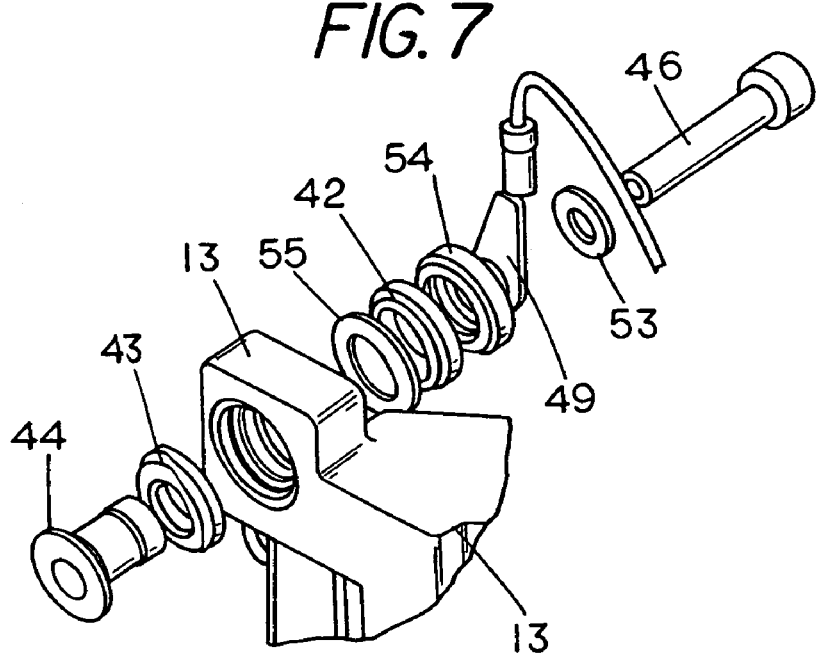
FIG. 7 is an exploded view showing the fastener with the elastomer mount for securing the device in the third axis in order to protect the device from vibration.

To appreciate the vibration mount of 40 reference should be made to FIG. 7 which shows an exploded view of the vibration isolation mount 40 showing how other features such as grounding member can be incorporated into the mounting assembly.

The exploded view shown in FIG. 7 shows an ear of the device 13 with shoulder screw 46 positioned to extend through a rigid electrical conducting washer 53, an electrical grounding lug 49, a rigid washer 54, an elastomer ring 42, a further washer 35, a collar 48, an elastomer ring 43 and ferrule 44. Once the shoulder screw is extended therethrough the device 13 can be mounted to a support housing as illustrated in FIG. 6 and FIG. 1.

We claim:

1. A vibration isolation attachable system comprising:
a device, said device having a first end, a second end and a dagger pin recess having a dimension sufficiently large to permit lateral displacement of the device without contact engagement with a dagger pin mounted on a mounting surface;
a dagger plate mounted on said first end, said dagger plate having a dagger pin alignment hole therein with the alignment hole extending along a first axis;
a dagger plate fastener for securing said dagger plate to the device;
an elastomer member forming a cushion between said dagger plate and said fastener to permit an elastic displacement of said dagger plate with respect to said fastener;
a fastening region on the second end of said device;
a further elastomer member positioned on said second end of said device; and
a second fastener for securing said second end of said device to the mounting surface, to thereby hold the device in position on the mounting surface while isolating the device from vibration.

2. The vibration isolation mount of claim 1 wherein the dagger plate is rigid.

3. The vibration isolation mount of claim 1 wherein the dagger plate fastener comprises a screw fastener for removable attaching the dagger plate to the device.

4. The vibration isolation mount of claim 1 wherein the elastomer member is bonded to the dagger plate.

5. A vibration isolation attachable system of claim 1 including at least two dagger plates mounted on said device.

6. A vibration isolation attachable system of claim 1 wherein the elastomer member includes a first annular flange and a second annular flange spaced from each other to permit elastomeric mounting the dagger plate on the device.

7. A vibration isolation attachable system of claim 1 wherein the elastomer member and the further elastomer member are bonded to the dagger plate.

8. A vibration isolation attachable system of claim 1 including a dagger pin on the mounting surface.

9. A vibration isolation attachable system of claim 8 wherein the dagger pin fits in a snug but non-interference fit in the alignment hole in the dagger plate.

10. A vibration isolation attachable system of claim 9 wherein the dagger plate is rigid and the dagger plate fastener comprises a threaded fastener.

* * * * *